Patented Oct. 30, 1945

2,387,884

UNITED STATES PATENT OFFICE 2,387,884

PROCESS FOR HYDROLYZING FATS

Robert C. Daniels, Cincinnati, Ohio, assignor to The Procter & Gamble Company, Cincinnati, Ohio, a corporation of Ohio No Drawing. Application July 20, 1942, Serial No. 451,657

6 Claims. (Cl. 260—415)

My invention relates to an improvement in processes for hydrolyzing fats.

It consists essentially of an improved method of splitting or hydrolyzing saponifiable fats for production of fatty acids and glycerine by countercurrent flow of preheated fat and preheated water in contact with each other under high temperature and pressure, this improvement comprising mixing with and dissolving in the fat, just prior to its introduction into the hydrolysis reaction chamber, an amount of water sufficient to partially or completely saturate the fat with respect to its water dissolving capacity at the temperature of hydrolysis.

This application is a continuation-in-part of my application, Serial No. 332,268, filed April 29, 1940.

The objects of my invention are: (1) to increase the production capacity of a given fat hydrolyzing unit in an economical manner, or (2) to permit the employment of a lower fat preheating temperature without lowering the completeness of split or the yield of glycerine, or (3) to increase the completeness of split and yield of glycerine. These alternative objectives are mutually interdependent, any one being attainable in the fullest measure to the exclusion of the other two, or a combination of any two or of all three of them being attainable in lesser measure. This will become evident from the more detailed disclosure which follows.

In United States Patent No. 2,156,863, issued to Victor Mills on May 2, 1939, a continuous countercurrent process for hydrolyzing fats is described, in which substantially water-free fat is preheated and introduced into a reaction chamber near its bottom, and water is preheated and introduced into this chamber near its top. I will refer to the practice according to this patent as the prior practice.

My present invention differs from this prior practice and has certain advantages over it in the new and beneficial steps of mixing water with the fat before preheating, and dissolving some or all of this water in the fat, as more fully explained hereinafter. My invention contemplates the employment of conditions during the fat presaturating step such that no appreciable splitting off of glycerine occurs before the fat enters the countercurrent hydrolyzing chamber. It thus differs from hydrolyzing processes which comprise a prolonged concurrent hydrolysis followed by a countercurrent hydrolysis; it has advantages over such processes in that it requires less equipment, and has a higher hydrolyzing efficiency.

In the discussion of my invention the term "fat" is to be considered synonymous with "saponifiable fat" or "saponifiable oil" or "fatty oil" or "glycerides of fatty acids," the term "hydrolyze" denotes the reaction of fat with water and the resulting production of fatty acids and glycerine, and the term "sweet water" denotes a solution of glycerine in water.

In carrying out my invention I mix fat to be hydrolyzed with a relatively smaller amount of water or with a substantial amount of sweet water (the preferred amount depending upon several factors which are discussed below), preferably in such a manner that the water or sweet water is broken up into relatively small increments or drops which become more or less emulsified in the fat and do not separate out in substantial volume before the next step of dissolving the water in the fat has occurred. I then promptly pass this fat-water or fat-sweet water mixture through a heat exchanger and quickly raise its temperature approximately to the desired hydrolyzing reaction temperature (or somewhat higher if less than the saturation amount of water has been used), maintaining a pressure sufficient to prevent the flashing into steam of any appreciable amount of the water in the mixture. During this preheating operation, which preferably is accomplished within about thirty to sixty seconds, the fat dissolves water, the amount dissolved being limited either by the total amount of water present or by the water-dissolving capacity of the particular fat at the final temperature reached, whichever of these amounts is the smaller.

The essential steps in carrying out my invention, namely, the introduction of the desired amount of water or sweet water into the fat and the dissolving of part or all of this water or sweet water by the fat, are accomplished in any convenient manner. For example, the water may be pumped at a known and measured rate in proportion to the flow of fat into a pipe which conveys the fat, preferably under conditions of turbulent flow, to a fat feed pump, which pump in turn delivers the fat through a preheater where the actual solution of water in the fat occurs of its own accord, and then into the hydrolyzing reaction chamber. If sweet water is employed, rather than water alone, a convenient method of operation comprises diverting a measured fraction of the sweet water issuing from the bottom of the reaction chamber and feeding this diverted fraction into the fat supply line between the fat feed pump and the fat preheater, at the same time increasing the opening of the sweet water outlet valve at the bottom of the chamber sufficiently to accommodate the increase in outflow of sweet water which results from recirculating this fraction.

From this point on the steps of the hydrolyzing process follow previously known practice which I will merely outline very briefly. Reference is made to the above noted Mills patent for a full description thereof. The aforementioned preheated fat-water or fat-sweet water solution, together with any undissolved excess of water or sweet water, is introduced in a continuous flow into a suitable enclosed vertical reaction chamber near its bottom, and a suitable quantity of water, normally greater in amount than the water already mixed with the fat, is preheated, under sufficient pressure to prevent volatilizing, to approximately the desired reaction temperature and introduced continuously, preferably in comminuted form, into the same reaction chamber near its top. In the reaction chamber, or reaction zone, which is kept under a pressure at least equal to that of saturated steam at the temperature of the liquids in said chamber, the water is caused to percolate downward through the fat-water solution as said solution is moved upward through the chamber, thus creating a countercurrent flow of the two reacting materials in intimate contact with each other, whereby the hydrolysis reaction between the fat and the water progresses with the liberation of fatty acids and glycerine, and whereby the liberated glycerine is washed out of the resulting fat-fatty acid-water solution by the descending flow of water. Fatty acids, with water in solution, which rise towards the top of the chamber and glycerine-water solution which settles to the bottom of the chamber, are constantly withdrawn from near the top and bottom of the chamber respectively as long as the supply to the chamber of preheated fat and preheated water is continued.

The reaction temperature should normally be at least 300° F. to 350° F. and is preferably somewhere between about 365° F. and about 550° F.

Having thus briefly outlined the essential steps in carrying out my invention, together with the related steps of the previously known countercurrent fat hydrolysis process, I will now discuss the elements of my invention in more detail.

I have found that the solution or dissolving of water in fat is accompanied by the absorption of a substantial amount of heat, and that if this act of solution is allowed to occur after the fat has been preheated and introduced into the reaction chamber, as has been the ordinary practice heretofore, the heat required to accomplish the act of solution is necessarily supplied by the reacting liquids themselves with a pronounced cooling of these liquids and consequently a reduction in the hydrolysis reaction rate. Under such conditions a cooling of the reacting liquids of as much as 50° F. has been observed. If, on the other hand, this act of solution of water in fat is caused to occur more or less completely before the fat has been fully preheated and introduced into the reaction chamber, as now proposed, most of this cooling of the reacting liquids in said chamber may be forestalled.

I have also found that additional benefits result from this predissolving step due to saving the time this step requires, whereby the total time in the reaction chamber becomes available for the splitting of the fat. I have found that the heat of the hydrolysis reaction is small and relatively unimportant in its effect on the reaction temperature, as compared with the relatively much greater negative heat of solution. I have also found that under the hereinbefore described conditions of saturating the fat with water no appreciable hydrolysis of fat to the extent of liberating free glycerine occurs prior to the entry of the fat into the countercurrent hydrolyzing chamber.

Advantage may be taken of this discovery of the step of predissolving water in the fat in any one of at least three ways:

1. If the preheating of the fat-water solution is carried to the same temperature as the preheating temperature of the fat alone in the prior practice, and if the same completeness of split and same glycerine yield are maintained, the application of my step will permit a higher fat throughput rate, or, in other words, increased production capacity.

2. If the same fat throughput rate (pounds of fat supplied per hour) is maintained as in the prior practice, the application of my new step will permit preheating the fat-water solution to a somewhat lower temperature than the fat preheating temperature in the prior practice, without any reduction in completeness of split or yield of glycerine.

3. If the preheating of the fat-water solution is carried to the same temperature as the preheating temperature of the fat alone in the prior practice, and if the same fat throughput rate is maintained, the result of applying my new step will be a higher reaction temperature, hence a greater reaction rate and in consequence a higher completeness of split and a higher glycerine yield.

By a combination of two or more of these three operating procedures it is possible to obtain to a greater or lesser degree two or more of the corresponding advantages.

If it were desired to obtain any of the above advantages without employing the step which my present invention comprises, it would be necessary either to increase the fat preheating temperature (which would be damaging to the fatty acid quality and would necessitate more costly operation of the boiler which supplies the heat), or to sacrifice a measurable degree of completeness of split and of glycerine yield (which sacrifice may be uneconomical), or to lower the fat throughput rate (which may also be uneconomical), or to make some other undesirable change such as materially increasing the ratio of total water to total fat (which would increase the sweet water evaporation cost in the subsequent step of producing crude glycerine). The utility of my invention thus becomes apparent.

In the preceding paragraphs mention has been made of the use of either water or sweet water to partially or completely presaturate the fat to be hydrolyzed. The use of water alone for this purpose, although advantageous in the main, has the one disadvantageous effect of slightly diluting the glycerine solution which is one of the two products of the process (for it should be understood that the water that is introduced with the fat near the bottom of the reaction chamber for the most part passes directly to the sweet water outlet at the bottom of the chamber, as it is largely replaced by water that has been independently introduced near the top of the chamber and has percolated downward through the ascending fatty material). If, however, sweet water is used instead of water alone, and especially if this sweet water has the same glycerine concentration as the sweet water issuing from the bottom of the reaction chamber, or a higher concentration, this undesirable dilution is avoided.

It is obvious that my invention is not limited to predissolving only water or sweet water in the fat to be hydrolyzed, but that any suitable aqueous liquid comprising water and any other material which will not adversely affect the efficiency of the process may be employed.

The maximum amount of water, when water alone is used, that I prefer to mix with the fat prior to preheating the latter is not in excess of the amount that the fat is capable of dissolving when heated to the desired temperature. The amount of water that the fat is capable of dissolving depends both on the composition and nature of the fat and on the temperature. The largest amount of water that would normally be employed when hydrolyzing at a temperature of about 470° F. is not in excess of fifteen pounds per hundred pounds of fat although more water, even above the saturation amount, may be used if desired.

The maximum amount of sweet water, when this is used rather than water alone, that I prefer to mix with the fat prior to preheating the latter may be considerably greater than the amount that the fat is capable of dissolving if this sweet water is a recirculated portion of the sweet water issuing from the bottom of the reaction chamber. In this event the recirculation of a relative large amount of sweet water (even an amount as great as the amount of fat), and the mixing of this recirculated sweet water with the fat to be preheated, will cause no undesirable dilution of the glycerine solution end product, and may be advantageous in increasing the heat transfer rate in the preheater, the extent of this result depending largely on the size and design of the preheater.

When sweet water containing a lower concentration of glycerine than that contained in the sweet water issuing from the bottom of the reaction chamber is mixed with the fat prior to preheating, the largest amount that would normally be employed when hydrolyzing at a temperature of about 470° F. is not in excess of fifteen pounds per one hundred pounds of fat, although more of such sweet water, even about the saturation amount, may be used if desired.

Less water or sweet water than that required to saturate the fat may be employed, but if too little is used the benefits will naturally be correspondingly less. In this connection it is noteworthy that the first pound of water that dissolves in dry fat appears to absorb more heat than the second pound, and each succeeding pound appears to absorb progressively less heat. The least amount of water or sweet water that would normally be added is not less than about one pound per hundred pounds of fat, because smaller amounts would not materially reduce the temperature drop in the reaction chamber. If less than the saturation amount is used there will, of course, be some temperature drop in the reaction chamber when additional water dissolves, and in this event the reaction temperature will necessarily be somewhat lower than the fat preheating temperature.

The optimum amount of water or of sweet water to mix with and dissolve in the fat prior to the introduction of the fat into the reaction chamber is a matter of economic values and equipment limitations, and can best be found by actual experience with each given fat and each hydrolyzing unit at the particular hydrolyzing temperature employed.

The total amount of water used in hydrolyzing according to my process, in proportion to the fat, (that is the total of the water introduced into the upper portion of the reaction chamber and that added with the fat), will ordinarily be the same as in the prior practice. The total amount of water used may, however, be varied in accordance with well known practice.

To illustrate the application of my invention by a typical example, I have found that when hydrolyzing tallow at a reaction temperature of about 470° F., very favorable results are obtained when about four pounds of sweet water (taken from the bottom of the reaction chamber) are predissolved in each one hundred pounds of fat supplied to the reaction chamber. The heat absorbed by the solution of this amount of water in tallow would, if the act of solution occurred in the reaction chamber, be enough to lower the temperature of the reaction liquids about 25° F. By accomplishing this step while the fat is passing through a heat exchanger, this heat of solution is supplied from the outside heating agent and no drop in temperature due to the heat of solution of this water occurs in the reaction chamber itself. Thus the reaction temperature is about 25° F. higher than it would otherwise have been if the fat containing substantially no water had been introduced into the reaction chamber at the same final preheating temperature. This 25° F. increase in reaction temperature speeds up the reaction rate over prior practice to such an extent that the production rate may be increased as much as twenty-five per cent with the same completeness of split and with the same amount of total water used per pound of fat.

As another typical example of the application of my invention, I have found that when hydrolyzing a mixture consisting of eighty per cent tallow and twenty per cent coconut oil at a reaction temperature of about 470° F., the fat preheating temperature may be lowered by as much as 28° F. from prior practice, with no change in fat throughput rate and no change in completeness of hydrolysis, if about four pounds of sweet water taken from the bottom of the reaction chamber are predissolved in each one hundred pounds of the fat to be hydrolyzed. In these examples the term "reaction temperature" refers to the temperature of the liquids in the reaction chamber at a point about midway between its top and its bottom.

Ordinarily it is advantageous to employ a suitable catalyst to facilitate the hydrolysis, examples of such catalyst being soaps of zinc, calcium and magnesium. In the event that a catalyst is used, it may be added to the fat before preheating the fat.

Having thus described my invention, what I claim and desire to secure by Letters Patent is:

1. In a process for hydrolyzing fats by causing preheated fat and preheated water to pass in countercurrent flow in intimate contact with each other at high temperature and pressure, the steps preceding the contacting of said preheated materials of mixing a liquid, the essential ingredient of which is chosen from the group consisting of water and "sweet water," with the fat to be hydrolyzed and preheating this mixture to approximately the desired temperature for hydrolyzing under conditions such as to preclude the splitting off of a significant amount of glycerine from said fat, accomplishing this preheating within about 30 to 60 seconds, thus producing a preheated solution of water in the fat, and then immediately introducing the fat into the countercurrent hydrolysis reaction zone and therein conducting said countercurrent hydrolysis, the amount of said liquid so mixed and of water so dissolved in the fat being sufficient to materially reduce the extent of the temperature drop that occurs when said preheated fat enters said reaction zone due to heat absorbed in dissolving water in fat.

2. The process of claim 1 in which the liquid which is mixed and preheated with the fat, is water.

3. The process of claim 1 in which the liquid which is mixed and preheated with the fat is water, the amount of water so mixed and dissolved in the fat being not substantially more than the amount required to produce a saturated solution of water in the fat when the mixture is so preheated.

4. In a continuous process for hydrolyzing fats by causing fat and water to pass in countercurrent direction in intimate contact with each other at high temperature and pressure in a reaction chamber, the steps of diverting a fraction of the "sweet water" issuing from the hydrolysis process, mixing this diverted "sweet water" with the fat to be hydrolyzed and preheating the mixture to approximately the desired temperature for hydrolyzing under conditions such as to preclude the splitting off of a significant amount of glycerine from said fat, accomplishing this preheating within about 30 to 60 seconds, thus producing a solution of water in the fat, and then immediately introducing said solution, together with any undissolved excess "sweet water," into the countercurrent hydrolysis reaction chamber and therein conducting said countercurrent hydrolysis.

5. In a continuous process for hydrolyzing fats by causing fat and water to pass in countercurrent direction in intimate contact with each other in a reaction chamber at a temperature of at least about 470° F. and under a pressure at least as high as the saturation pressure of steam at the temperature employed, the steps of mixing from about one to about fifteen pounds of liquid, the essential ingredient of which is water, with each 100 pounds of the fat to be hydrolyzed and preheating this mixture to at least about 470° F. under conditions such as to preclude the splitting off of a significant amount of glycerine from said fat, accomplishing this preheating within about 30 to 60 seconds, thereby producing a preheated solution of water in the fat; and immediately introducing said solution into the countercurrent reaction chamber and therein conducting said countercurrent hydrolysis.

6. The process of claim 1 in which the said countercurrent flow and hydrolysis comprises establishing an upwardly flowing column of fat, heated to a temperature above 300° F., in a suitable chamber under sufficient pressure to maintain water at said temperature in the liquid state, and causing water at said temperature to percolate downward in comminuted form through said rising column of fat, the heat stored in said fat and said water before contacting each other in said chamber being sufficient to cause the subsequent hydrolysis, continuously removing hydrolyzed fat from the chamber above the point of water introduction and continuously removing "sweet water" from the chamber below the point of fat introduction, the period of contact of fat with water in said chamber being sufficient to cause a substantal splitting of glycerin from the fatty acids.

ROBERT C. DANIELS.